United States Patent [19]

Udono

[11] 4,420,934
[45] Dec. 20, 1983

[54] AUTOMOTIVE VEHICLE HYDRAULIC SYSTEM

[75] Inventor: Jun Udono, Higashiyamato, Japan

[73] Assignee: Nissan Motor Company, Ltd., Yokohama, Japan

[21] Appl. No.: 116,639

[22] Filed: Jan. 29, 1980

[30] Foreign Application Priority Data

Jan. 30, 1979 [JP] Japan .................................. 54-8674

[51] Int. Cl.³ ...................... F15B 11/20; G05D 11/02
[52] U.S. Cl. .................................. 60/422; 60/547.2; 60/484; 91/29; 91/31; 91/33; 91/516; 91/518; 91/520; 137/101; 137/117
[58] Field of Search .................... 91/29, 31, 516, 518, 91/520, 33; 60/547 A, 422, 484; 137/117, 101

[56] References Cited

U.S. PATENT DOCUMENTS

| | | | |
|---|---|---|---|
| 3,561,327 | 2/1971 | Strample | 91/516 |
| 3,662,548 | 5/1972 | Suzuki et al. | 137/101 |
| 3,837,421 | 9/1974 | Ron | 60/422 X |
| 3,915,186 | 10/1975 | Thomas | 137/117 |
| 3,941,142 | 3/1976 | Adachi et al. | 137/101 |
| 4,070,858 | 1/1978 | Hand | 137/101 |
| 4,075,840 | 2/1978 | Jesswein | 137/101 |
| 4,139,988 | 2/1979 | Adachi | 60/547 A |

FOREIGN PATENT DOCUMENTS

| | | |
|---|---|---|
| 2402017 | 7/1975 | Fed. Rep. of Germany . |
| 829145 | 2/1960 | United Kingdom . |
| 1475657 | 6/1977 | United Kingdom . |
| 1522014 | 8/1978 | United Kingdom . |
| 1535014 | 12/1978 | United Kingdom . |
| 1539997 | 2/1979 | United Kingdom . |

Primary Examiner—George L. Walton
Attorney, Agent, or Firm—Schwartz, Jeffery, Schwaab, Mack, Blumenthal & Koch

[57] ABSTRACT

A hydraulic system is disclosed for use in an automotive vehicle including an engine, a power steering gear, and a brake booster. The system includes a single engine driven pump in fluid communication with first and second fluid flow control means. The first fluid flow control means responsive to fluid inputs for discharging a small or large predetermined amount of hydraulic fluid to control the operation of the power steering gear. The second fluid flow control means supplies a constant amount of hydraulic fluid to control the operation of the brake booster.

11 Claims, 8 Drawing Figures

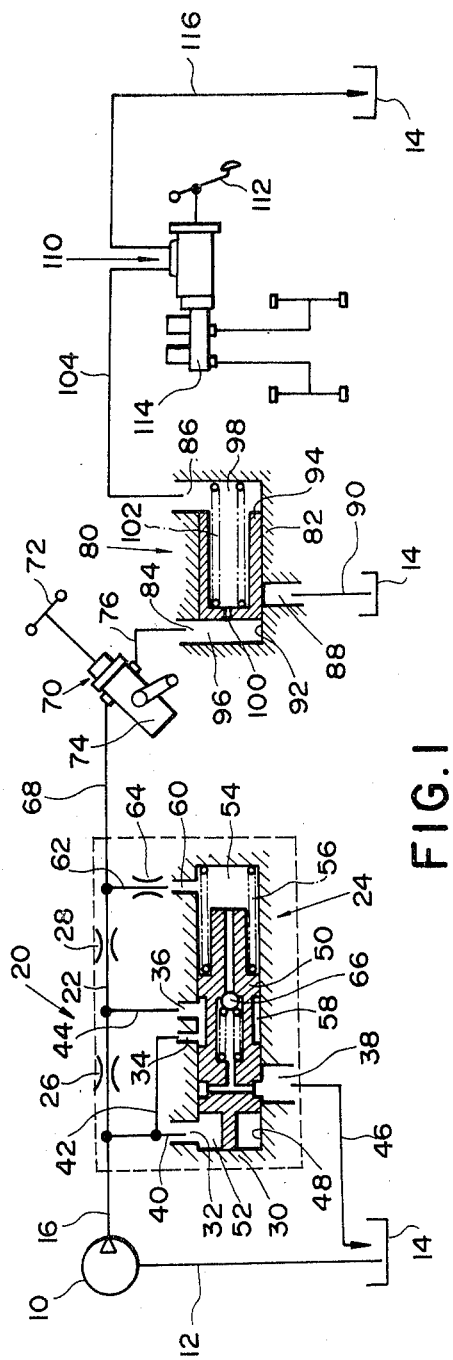
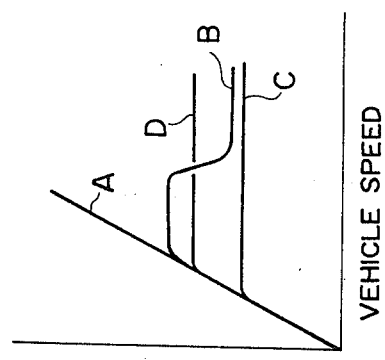
FIG. 1
FIG. 2

AUTOMOTIVE VEHICLE HYDRAULIC SYSTEM

BACKGROUND OF THE INVENTION

1. Field of the Invention

This invention relates to an automotive vehicle hydraulic system for use with power steering and brake booster units including open-center type hydraulic control valves.

2. Description of the Prior Art

It is an inherent characteristic of an automotive vehicle to be turned with a lighter force on the steering wheel when running at higher speeds. For stable steering operations over the full range of vehicle speeds, it is required for the power steering unit to have a large supply of hydraulic fluid for allowing easy turning of the steering wheel at low vehicle speeds and a small supply of hydraulic fluid for suppressing over-turning of the steering wheel at high vehicle speeds. However, if the brake booster unit has a large supply of hydraulic fluid at low vehicle speeds and a small supply of hydraulic fluid at a high vehicle speeds, the brakes will have less effect at high vehicle speeds. For stable braking operations over the full range of vehicle speeds, it is required for the brake booster unit to have a constant supply of hydraulic fluid.

In conventional automotive vehicle hydraulic systems including power steering and brake booster units, two pump means have been required, one adapted to supply to the power steering unit hydraulic fluid in amounts varying in accordance with vehicle speeds and the other adapted to supply a constant amount of hydraulic fluid to the brake booster unit, resulting in a large-sized and expensive system.

SUMMARY OF THE INVENTION

It is therefore one object of the present invention to provide an automotive vehicle hydraulic system which is operable with a single engine driven pump.

Another object of the present invention is to provide an automotive vehicle hydraulic system which is simple in structure, small in size, and inexpensive to produce.

Other objects, means, and advantages of the present invention will become apparent to one skilled in the art thereof from the following description.

BRIEF DESCRIPTION OF THE DRAWINGS

The following explanation of several preferred embodiments of the present invention will help in the understanding thereof, when taken in conjunction with the accompanying drawings, which, however, should not be taken as limiting the present invention in any way, but which are given for purposes of illustration only. In the drawings, like parts are denoted by like reference numerals in the several figures, and FIG. 1 is a schematic view showing one embodiment of a automotive vehicle hydraulic system constructed in accordance with the present invention;

FIG. 2 is a graph showing the changes in fluid flow at the outlet sides of the elements of the system of FIG. 1 as a function of engine speed;

DESCRIPTION OF THE PREFERRED EMBODIMENTS

Figure 3:
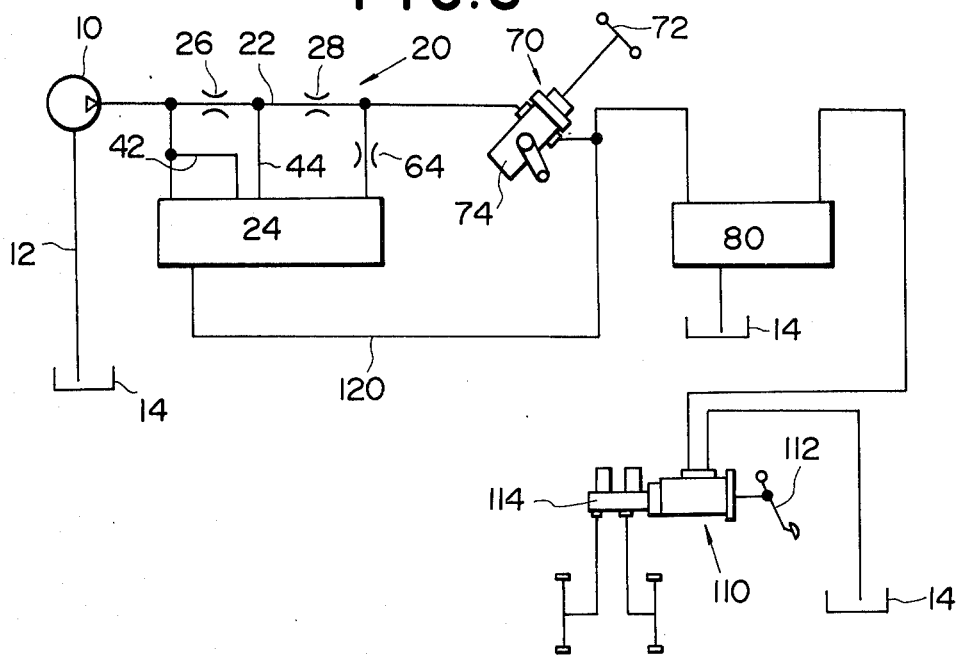
FIG. 3 is a schematic view showing a second embodiment of the present invention.

Referring now to FIG. 1, there is illustrated one embodiment of an automotive vehicle hydraulic system made in accordance with the present invention. The hydraulic system comprises an engine driven pump 10 having its inlet side communicated through a conduit 12 with a reservoir 14 for discharging at its outlet side hydraulic fluid in amounts increasing as the speed of rotation of the engine (not shown) increases. The outlet side of the pump 10 is connected through a conduit 16 to the inlet side of a fluid flow control unit 20.

The fluid flow control unit 20 comprises a main passage 22 extending between the inlet and outlet sides thereof and a first pressure responsive valve 24. The main passage 22 has therein a first orifice 26 and a second orifice 28 located downstream of the first orifice 26. The first pressure responsive valve 24 includes a housing 30 provided with a pressure port 32, an inlet port 34, an outlet port 36, and a drain port 38. The pressure port 32 is connected through a conduit 40 to the main passage 22 at a position upstream of the first orifice 26. The inlet port 34 is communicated through a passage 42 and conduit 40 to the main passage 22 at a position upstream of the first orifice 26. The outlet port 36 is connected through a passage 44 to the main passage 22 between the first and second orifices 26 and 28. The drain port 38 communicates with the reservoir 14 through a return line 46.

The housing 30 of the pressure responsive valve 24 is formed with a bore 48 which slidably receives a piston 50 dividing the housing 30 into first and second chambers 52 and 54 at the respective ends of the piston 50. A spring 56 is located in the second chamber 54 for urging the piston 50 to the left, as viewed in FIG. 1. The piston 50 is formed with an external annular groove 58 in its outer surface for communication between the inlet and outlet ports 34 and 36 when the position of the piston 50 is as shown in FIG. 1.

The housing 30 is further formed with a port 60 opening into the second chamber 54 and communicating with the main passage at a position downstream of the second orifice 28 through a conduit 62 which has therein an anti-dumping orifice 64. The second chamber 54 is also connected to the drain port 38 through a passage longitudinally extending through the piston 50 and having therein a relief valve 66.

Assuming now that the engine speed is relatively low and the amount of the hydraulic fluid supplied from the pump 10 is relatively small, the position of the piston 50 is as illustrated in FIG. 1, at which time the piston 50 establishes communication between the inlet and outlet ports 34 and 36 and cuts off communication between the first chamber 52 and the drain port 38. Thus, most of hydraulic fluid supplied from the pump 10 flows through the passages 42 and 44 which act as a by-pass for the first orifice 26. As a result, the fluid flow control unit 20 discharges at its outlet side hydraulic fluid in amounts increasing as the amount of the hydraulic fluid supplied from the pump 10 increases, as shown by line A of FIG. 2.

When the amount of the hydraulic fluid discharged from the pump 10 reaches a first level predetermined for the fluid flow control unit 20, the piston 50 moves to the right in the drawing against the force of the spring 56 so as to establish communication between the first chamber 52 and the drain port 38 but maintains communication between the inlet and outlet ports 34 and 36. As a result, the fluid flow control unit 20 discharges at its outlet side hydraulic fluid in an amount substantially equal to the first predetermined level with the excessive hydraulic fluid discharged from the drain port 38 to the reservoir 14.

When the amount of the hydraulic fluid supplied from the pump 10 further increases to a higher level, the piston 50 further moves to the right in the drawing against the force of the spring 56 so as to cut off communication between the inlet and outlet ports 34 and 36 but maintains communication between the first chamber 52 and the drain port 38. As a result, the fluid flow control unit 20 discharges at its outlet side hydraulic fluid in an amount substantially equal to a second predetermined level which is smaller than the first predetermined level with the excessive hydraulic fluid discharged from the drain port 38 to the reservoir 14.

That is, the amount of the hydraulic fluid discharged from the outlet side of the fluid flow control unit 20 is communicated through an outlet conduit 68 to a power steering unit 70.

The power steering unit 70 includes a steering wheel 72 and a steering gear valve 74 of the open center type operatively connected to the vehicle wheels in a manner well known to those skilled in the art. The steering gear valve 74 allows free passage of the hydraulic fluid from the fluid flow control unit 20 when the steering wheel 72 is not turned and throttles the hydraulic fluid to create a hydraulic pressure therein when the steering wheel 72 is turned. The outlet port of the steering gear valve 74 is connected through a conduit 76 to a second pressure responsive valve 80.

The second pressure responsive valve 80 includes a housing 82 provided with an inlet port 84 and an outlet port 86, and a drain port 88. The inlet port 84 is communicated to the outlet side of the steering gear valve 74 through the conduit 76. The drain port 88 communicates to the reservoir 14 through a return line 90. The housing 82 of the second pressure responsive valve 80 is formed with a bore 92 which slidably receives a piston 94 dividing the housing 82 into a first chamber 96 into which the inlet port 84 opens and a second chamber 98 into which the outlet port 86 opens. The first and second chambers 96 and 98 are communicated through an orifice 100 provided in the piston 94. A spring 102 is located in the second chamber 98 for urging the piston 94 to the left in the drawing.

Assuming that the amount of the hydraulic fluid from the steering gear valve is smaller than a level predetermined for the second pressure responsive valve 80, the piston 94 is held in a position, as shown in FIG. 1, to cut off communication between the first chamber 96 and the drain port 88 so that all of the hydraulic fluid supplied therein flows through the orifice 100 to the outlet port 86. When the amount of the hydraulic fluid increases over the predetermined level, the piston moves to the right in the drawing against the force of the spring 102 to establish communication between the first chamber 96 and the drain port 88 so as to allow the excessive hydraulic fluid to drain through the conduit 90 to the reservoir 14. As a result, the second pressure responsive valve 80 discharges at its outlet side a constant amount of hydraulic fluid, as shown by the line C of FIG. 2.

The outlet port of the second pressure responsive valve 80 is connected through a conduit 104 to the inlet side of a brake booster 110 associated with a brake pedal 112. The brake booster 110 includes an open-center type booster valve which allows free passage of the hydraulic fluid supplied from the second pressure responsive valve 80 when the brake pedal 112 is not depressed and throttles the hydraulic fluid to create a hydraulic pressure operating the brake master cylinder 114. The outlet port of the booster valve is connected through a conduit 116 to the reservoir 14.

In the automotive vehicle hydraulic system of this embodiment, the pump 10, having its inlet port connected through the inlet conduit 12 to the reservoir 14, discharges at its outlet port hydraulic fluid in amounts substantially proportional to the speed of rotation of the engine, as shown by line A. The discharged hydraulic fluid is communicated through the fluid flow control unit 20 to the power steering gear valve 70. The fluid flow control unit 20 discharges at its outlet port hydraulic fluid in amounts controlled as shown by line B of FIG. 2 and drains at its drain port the excessive fluid, which is shown by the area between lines A and B of FIG. 2, to the reservoir 14. Thus, the power steering unit can have a large amount of hydraulic fluid to allow the driver to turn the steering wheel with a relatively light force at low engine speeds and have a small amount of hydraulic fluid to require for the driver to turn the steering wheel with a relatively heavy force.

The hydraulic fluid discharged from the outlet port of the steering gear valve 74 is communicated through the second pressure responsive valve 80 to the brake booster 110. The second pressure responsive valve 80 discharges at its outlet port 86 a constant amount of hydraulic fluid independently of engine speeds, as shown by line C of FIG. 2 and drains at its drain port 88 the excessive fluid, which is shown by the area between lines B and C of FIG. 2, to the reservoir 14. Thus, the brake booster 110 can have a constant amount of hydraulic fluid.

Referring to FIG. 3, there is illustrated a second embodiment of the present invention which is substantially similar to the first embodiment except that the drain port 38 of the first pressure responsive valve 24 is communicated through a conduit 120 to the conduit 76 downstream of the power steering gear valve 74 for permitting the second pressure responsive valve 80 to have a greater amount of hydraulic fluid. In this embodiment, the second pressure responsive valve 80 is designed such as to discharge at its outlet port a larger amount of hydraulic fluid. This arrangement is suitable particularly for a brake booster requiring a large supply of hydraulic fluid. The amount of the hydraulic fluid discharged from the outlet port of the second pressure operative valve 80 of this embodiment is as shown by line D of FIG. 2.

Figure 4:
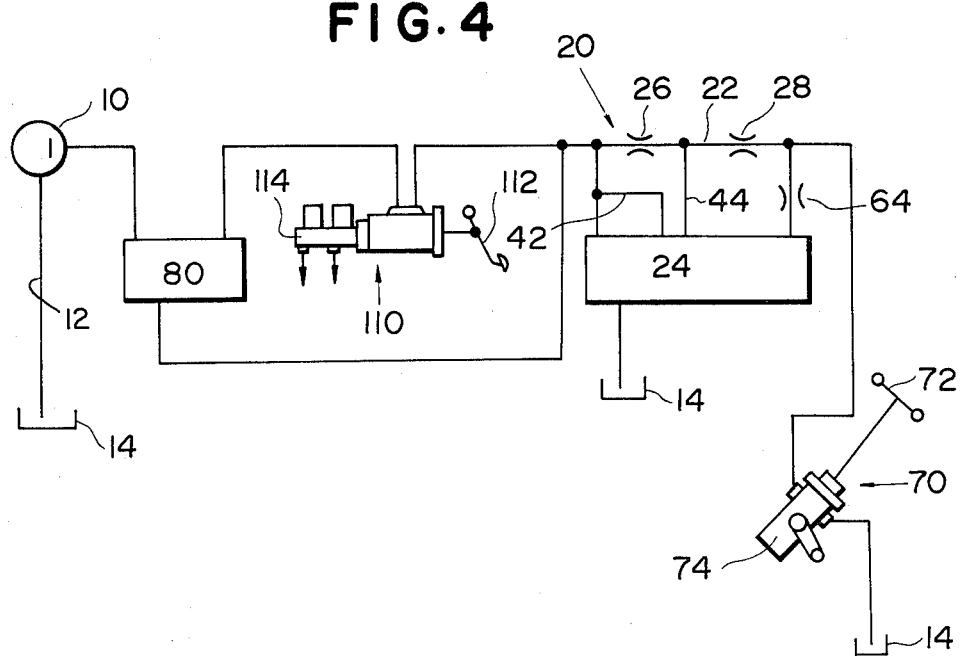
FIG. 4 is a schematic view showing a third embodiment of the present invention.

Referring to FIG. 4, there is illustrated a third embodiment of the present invention wherein the brake booster 110 is located upstream of the power steering gear unit 70. In this embodiment, the outlet port of the pump 10 is connected to the inlet port of the second pressure responsive valve 80, the outlet port of which is connected to the inlet side of the brake booster 110. The fluid flow control unit 20 has a supply of hydraulic fluid from the outlet side of the brake booster 110 and also from the drain port of the second pressure responsive valve 80. The output side of the fluid flow control unit 20 communicates with the inlet side of the power steering unit 70.

Figure 5:
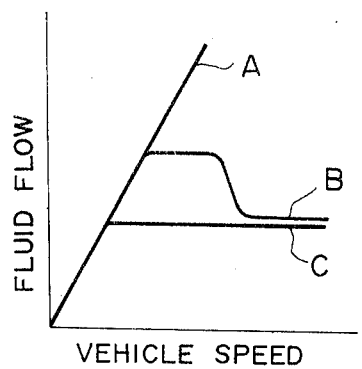
FIG. 5 is a graph used to explain the operation of the system of FIG. 4.

The amount of the hydraulic fluid supplied from the pump 10 is as shown by line A of FIG. 5. The second pressure responsive valve 80 supplies a constant amount of hydraulic fluid, as shown by line C of FIG. 5, to the brake booster 110 and discharges from its drain port to the fluid flow control unit 20 hydraulic fluid in amounts shown by the area between lines A and C of FIG. 5. As a result, the fluid flow control unit 20 has a supply of hydraulic fluid as shown by line A of FIG. 5.

Figure 6:
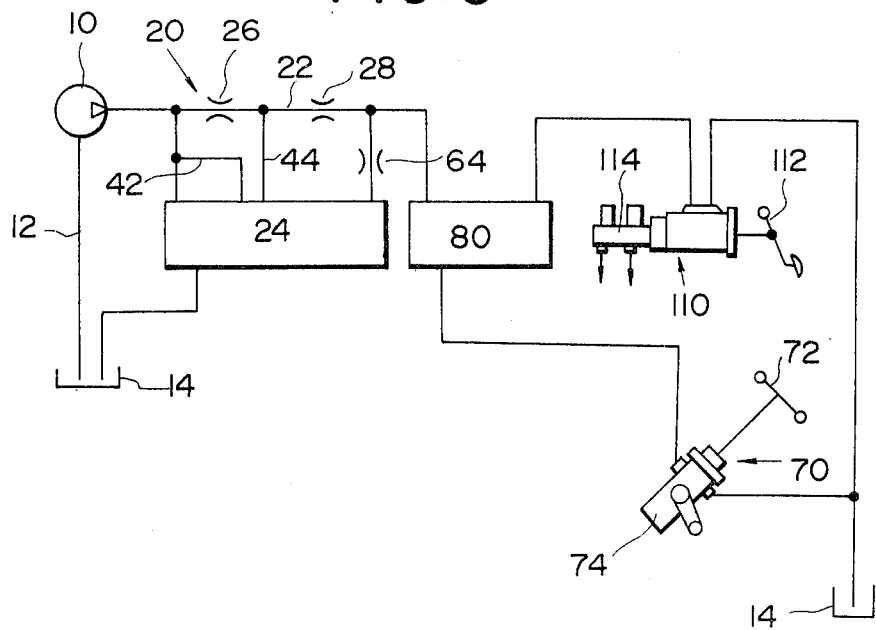
FIG. 6 is a schematic view showing a fourth embodiment of the present invention.

Referring to FIG. 6, there is illustrated a fourth embodiment of the present invention. The chief difference between the first and fourth embodiments is that the outlet side of the fluid flow control unit 20 is connected to the inlet port of the second pressure responsive valve 80, the outlet port of which is connected to the inlet side of the brake booster 110 and the drain port of which is communicated with the inlet side of the power steering unit 70. The outlet sides of the brake booster 110 and power steering unit 70 are connected to the reservoir 14.

Figure 7:
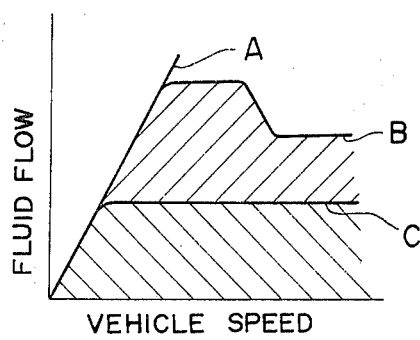
FIG. 7 is a graph used in explaining the operation of the system of FIG. 6.

In this embodiment, the brake booster 110 has a supply of hydraulic fluid as shown by line C of FIG. 7 and the power steering unit 70 has a supply of hydraulic fluid as shown by the area between lines B and C of FIG. 7, wherein line A indicates the amount of the hydraulic fluid discharged from the pump 10, and line B indicates the amount of the hydraulic fluid discharged from the fluid flow control unit 20. This arrangement requires a pump capable of supplying a large amount of hydraulic fluid.

Figure 8:
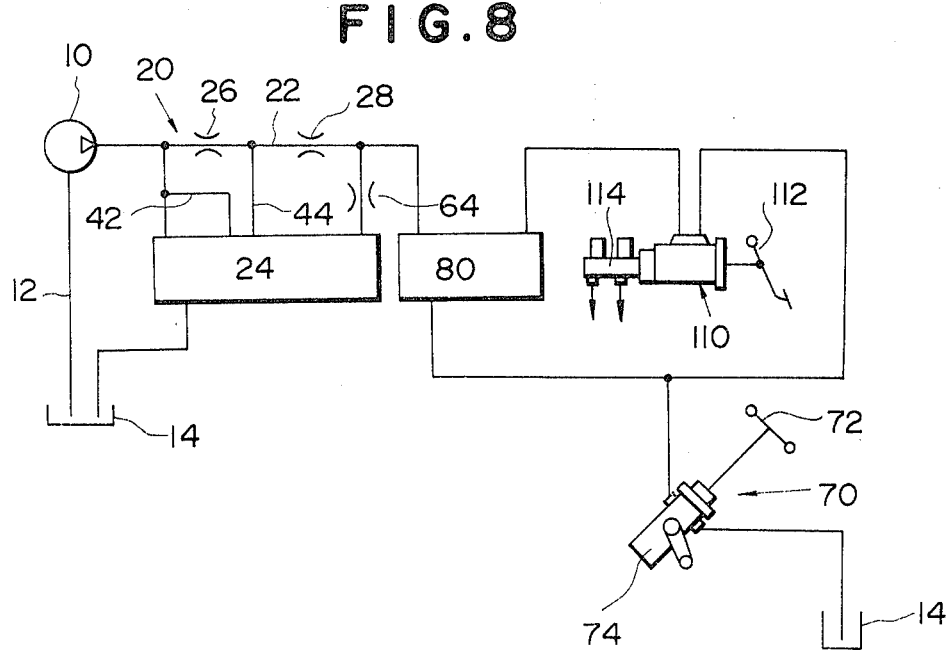
FIG. 8 is a schematic view showing a fifth embodiment of the present invention.

Referring to FIG. 8, there is illustrated a fifth embodiment of the present invention which is substantially similar to the fourth embodiment except that the output side of the brake booster 110 is connected to the inlet side of the power steering unit 70. This arrangement can reduce the amount of hydraulic fluid required in the hydraulic system.

Although the present invention has been described in connection with an automotive vehicle hydraulic system including a power steering unit and a brake booster, it is to be noted that the brake booster may be substituted with a clutch booster including an open center type hydraulic control valve.

There has been provided, in accordance with the present invention, an automotive vehicle hydraulic system including a power steering unit and a brake or clutch booster which can operate with a single engine driven pump and which is simple in structure, small in size and inexpensive to produce.

What is claimed is:

1. A hydraulic system for use in an automotive vehicle including an internal combustion engine, comprising:
    (a) an engine driven pump adapted to discharge hydraulic fluid in amounts directly proportional to the operating speed of said engine;
    (b) a first hydraulic unit including a first fluid flow control means and a first open-center type hydraulic control valve included in a power steering unit, said first fluid flow control means being arranged to receive fluid supplied thereto in varying amounts and to discharge to said first open-center type hydraulic control valve fluid at a first predetermined flow rate in response to the receipt of fluid at a low flow rate and to discharge to said first open-center type control valve fluid at a second predetermined flow rate smaller than said first predetermined flow rate in response to the receipt of fluid at a high flow rate; and
    (c) a second hydraulic unit including a second fluid flow control means and a second open-center type hydraulic control valve, said second fluid flow control means being arranged to receive fluid supplied thereto at varying flow rates and, regardless of said received varying flow rates, to discharge fluid at a constant flow rate to said second open-center type hydraulic control valve;
    (d) said engine driven pump, said first hydraulic unit and said second hydraulic unit being connected in series with each other.

2. A hydraulic system according to claim 1, wherein said second open-center type hydraulic control valve is included in a brake booster.

3. A hydraulic system according to claim 1, wherein said second open-center type hydraulic control valve is included in a clutch booster.

4. A hydraulic system according to claim 1, wherein said first hydraulic unit is connected in series between said engine driven pump and said second hydraulic unit inlet.

5. A hydraulic system according to claim 4, wherein said first fluid flow control means has a port for discharging the hydraulic fluid in excess of that supplied to said first control valve.

6. A hydraulic system according to claim 5, wherein said first fluid flow control means port is communicated with said second hydraulic unit.

7. A hydraulic system according to claim 6, wherein the flow rate of hydraulic fluid supplied to said second open-center type hydraulic control valve is between said first and second predetermined flow rates.

8. A hydraulic system according to claim 1, wherein said first fluid flow control means comprises:
    a main passage having an inlet communicating with said pump and an outlet communicating with said said open-center type hydraulic control valve;
    a first restriction orifice disposed in said main passage;
    a second restriction orifice disposed in said main passage downstream of said first restriction orifice;
    a bypass connected at its one end to said main passage upstream of said first restriction orifice and at its other end to said main passage downstream of said first restriction orifice; and
    valve means provided in said bypass passage for closing said bypass passage when the pressure of hydraulic fluid at said main passage inlet exceeds a predetermined value.

9. A hydraulic system according to claim 8, wherein said valve means comprises:
    a body having a bore with first, second, and third ports;
    a plunger disposed for sliding movement within said bore to form at its opposite ends first and second chambers, said first chamber communicating with said main passage upstream of said first restriction orifice, said second chamber communicating with said third port, said plunger being formed with a recess for connecting said first and second ports to form a part of said bypass passage;
    a spring for urging said plunger toward said first chamber; and said plunger being movable to disconnect said first port from said recess and to connect said first chamber to said third port when the pressure of hydraulic fluid in said first chamber exceeds a predetermined value.

10. A hydraulic system according to claim 9, wherein said second chamber communicates through a restriction orifice with said main passage downstream of said second restriction orifice.

11. A hydraulic system according to claim 1, wherein said second fluid flow control means comprises:

a body having a bore formed with a drain port;

a plunger disposed for sliding movement within said bore to form at its opposite ends first and second chambers, said first chamber communicating with said first open-center type hydraulic control valve, said second chamber communicating with said second open-center type hydraulic control valve, said plunger having a restriction orifice with its inlet side opening into said first chamber and its outlet side opening into said second chamber;

a spring for urging said plunger toward said first chamber; and said plunger being movable to connect said first chamber to said drain port when the pressure of hydraulic fluid charged in said first chamber exceeds a predetermined value.

* * * * *

UNITED STATES PATENT AND TRADEMARK OFFICE
CERTIFICATE OF CORRECTION

PATENT NO. : 4,420,934

DATED : December 20, 1983

INVENTOR(S) : Jun Udono

It is certified that error appears in the above-identified patent and that said Letters Patent is hereby corrected as shown below:

Column 6, line 42, claim 8, "said" should read --first--.

Signed and Sealed this

Sixth Day of March 1984

[SEAL]

Attest:

GERALD J. MOSSINGHOFF

Attesting Officer

Commissioner of Patents and Trademarks